United States Patent [19]

Brodie et al.

[11] 4,038,527
[45] * July 26, 1977

[54] SIMPLIFIED STRAPPED DOWN INERTIAL NAVIGATION UTILIZING BANG-BANG GYRO TORQUING

[75] Inventors: Peter Michael Brodie, Oakland; Edwin George Solov, Wayne, both of N.J.

[73] Assignee: The Singer Company, Little Falls, N.J.

[*] Notice: The portion of the term of this patent subsequent to Dec. 9, 1992, has been disclaimed.

[21] Appl. No.: 624,343

[22] Filed: Oct. 21, 1975

[51] Int. Cl.² .................... G01C 21/16; G06F 15/50
[52] U.S. Cl. ................... 235/150.25; 244/3.2; 244/172
[58] Field of Search ............... 235/150.25, 150.2, 186, 235/189; 244/3.2, 77 R, 77 B, 77 D, 77 G; 33/321; 73/178 R

[56] References Cited

U.S. PATENT DOCUMENTS

| 3,231,726 | 1/1966 | Williamson | 244/3.2 X |
|---|---|---|---|
| 3,272,972 | 9/1966 | Yamron | 235/150.25 |
| 3,374,966 | 3/1968 | Howard | 244/3.2 |
| 3,597,598 | 8/1971 | McAllister et al. | 235/150.25 |
| 3,924,824 | 12/1975 | Brodie et al. | 244/3.2 |

*Primary Examiner*—Joseph F. Ruggiero
*Attorney, Agent, or Firm*—Laurence A. Wright; Thomas W. Kennedy

[57] ABSTRACT

A self-contained, strapped down guidance system combining all axes, all attitude navigation having two wide angle, two-degree-of-freedom gyros which provide attitude angle and angular rate signals along three axes. Accelerometer means provide signals representative of the acceleration along three orthogonally displaced independent axes. A first transformation matrix connected to the attitude angle output of the gyros and to the accelerometers transforms the gyro and accelerometer signals from body coordinates to gyro coordinates. A second transformation matrix connected to the output of the gyros, transforms the gyro coordinates into navigation coordinates. In order to perform navigational computations, computing means compute a transformation from gyro momentum vector (referenced to coordinate frame) to a navigational coordinate frame such as a locally vertical frame wherein the Z axis is always along the local vertical direction.

8 Claims, 5 Drawing Figures

SIMPLIFIED STRAPPED DOWN INERTIAL NAVIGATION UTILIZING BANG-BANG GYRO TORQUING

This invention is related to strapped down navigation systems. More particularly, this invention is related to a strapped down navigation system combining all axis, all attitude navigation.

BACKGROUND OF THE INVENTION

This invention is an improvement over U.S. patent application Ser. No. 407,121 now U.S. Pat. No. 3,924,824, Oct. 10, 1973, assigned to the same assignee as the present invention.

A strapped down navigation system derives its name because the inertial components comprising the gyros and accelerometers are "strapped down" or body mounted to the vehicle in which it is contained. In conventional strapped down inertial navigation systems, the gyro torquers are driven to force the spin axis (also referred to as the momentum vector) to coincide with the null axis. This practice necessitates a high up-date rate in the computer on the integration of the attitude equation. It also requires that the maximum torquer rate be able to compensate for high frequency small angle body motions. Basic to the disclosure of the application referred to above is a concept of a two step transformation from body fixed to inertially fixed coordinate frames. The first of these transformations is an attitude transformation based upon gyro pickoff outputs. The second transformation is based upon the angular rate of the gyro's momentum vector. This concept remains unchanged in the present invention and the improvements of the present invention include the above cross-track navigation concept and extends it to general all axis, all attitude navigation. Moreover, the present invention overcomes the restriction of the above device that the trajectory of the vehicle must be close to planar.

BRIEF DESCRIPTION OF THE INVENTION

The present invention provides a self contained strapped down inertial guidance system having two wide angle, two-degree-of-freedom gyros which are loosely captured and which furnish to a computing means attitude angle and angular rate signals along three axes. An accelerometer means also furnishes to the computing means signals representative of the acceleration along three linearly independent axes. A first transformation matrix in the computing means connected to the outputs of the gyros and accelerometers transforms the gyro and accelerometer signals from body coordinates to gyro coordinates. A second transformation matrix in the computing means connected to the output of the first matrix and to the gyros transforms the gyro coordinates into navigation coordinates. In order to perform navigational computations, computing means compute a transformation from gyro momentum vector (referenced to coordinate frame) to a navigational coordinate frame such as a locally vertical frame wherein the Z axis is always along the local vertical direction.

Accordingly, it is an object of this invention to provide an inertial navigation system in which a wide angle gyroscope is combined with constant level or bang-bang torquing to simplify computations in an all axis, all attitude, strapped down navigation system.

Another object of this invention is to provide an inertial navigation system in which the system is desensitized to higher frequency effects such as vehicle angular vibrations because the gyroscopes do not have tightly captured inertial elements which would necessarily follow all vehicle motion and vibrations.

These and other objects features and advantages of the present invention will become apparent from the following description taken in conjunction with the accompanying drawings wherein.

Figure 1:
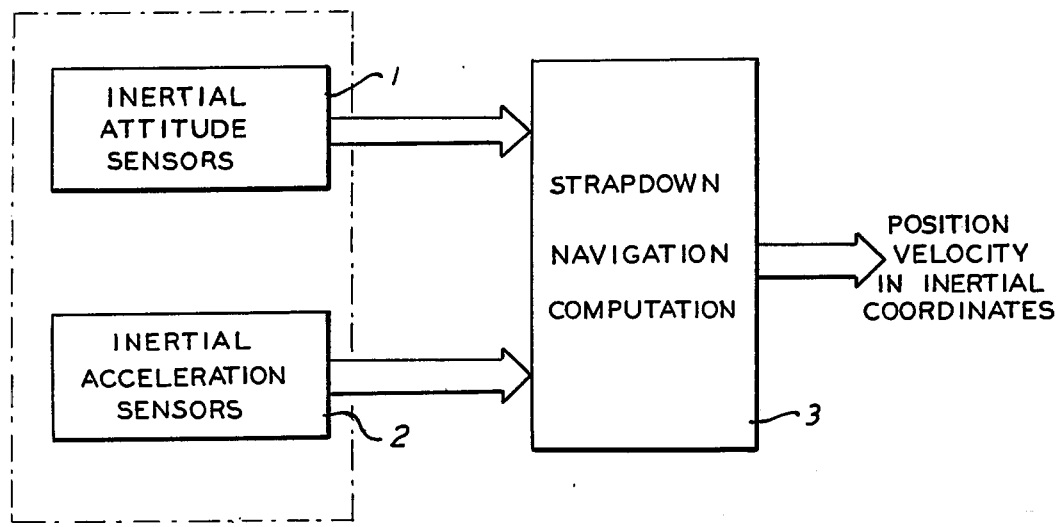
FIG. 1 is a simplified block diagram of a conventional strapped down inertial navigation system.

Referring to FIG. 1, there is shown a block diagram of a basic strapped down navigation system. The block diagram contains the attitude and acceleration sensors plus the computing means. Block 1 provides signals representing attitude angles and attitude rates to computing means 3. Block 2 provides signals representing acceleration along the non-coplanar axes to computing means 3. In the computing means the inertially sensed accelerations are transformed from a body fixed coordinate frame to an inertially fixed frame or other navigation frame, such as locally vertical frame.

Figure 2:
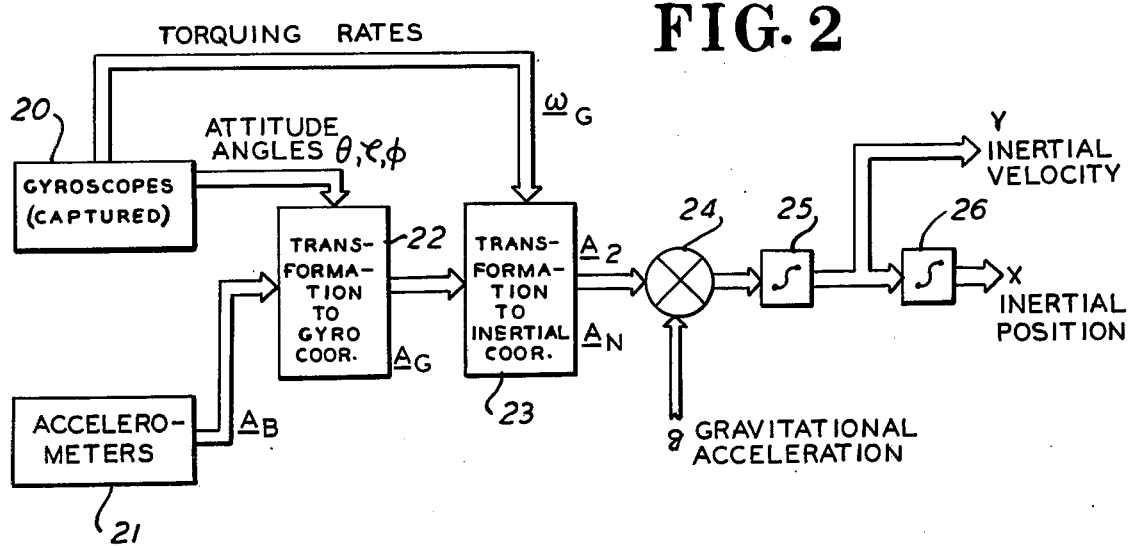
FIG. 2 is a block diagram of the improved strapped down inertial navigation system of the invention.

Referring to FIG. 2, block 20 contains two wide angle, two-degree-of-freedom gyros which have their cases rigidly mounted to the vehicle so that their momentum vectors are non-parallel. The gyros are torqued in such a manner that the long term torquing rates equal those of the vehicle so that all vehicle restrictions are removed. The spin axes of the gyros are adjusted so as to neither exceed a predetermined amount of angular freedom nor exceed the mechanical stops of the gyros. Angles $\theta$, $\psi$ and $\phi$ representing pitch, roll and yaw attitude signals respectively from the gyros are fed to a first transformation matrix 22 for coordinate computation. Acceleration signals along three non-coplanar axes are derived from block 21 and are also applied to matrix 22 where these inputs are transformed from body coordinates to gyro coordinates. The gyro coordinates output from matrix 22 is then applied with an input representing angular rate from the gyros 20 to the matrix 23 for computing the acceleration in navigation coordinates. The output signals representing acceleration in navigation coordinates from matrix 23 are applied to summing network 24. Also fed to network 24 is a signal, $g$, representing gravitationalacceleration. Thus, the output of network 24 is a signal representing the acceleration in navigation coordinates corrected for gravitational acceleration. This signal is fed to a first integrating circuit 25 wherein the velocity $(y)$ is computed and an output obtained. The same signal is also fed to a second integrating circuit 26 for computing position $(x)$ as an output.

Figure 3:
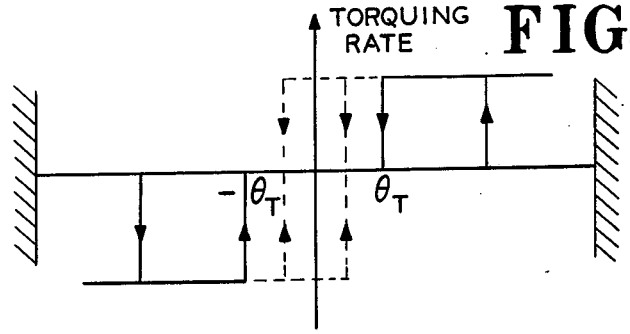
FIG. 3 is a graphical representation of the bang-bang gyro torquing technique of the invention.

As can be noted from FIG. 2, the gyros supply both a measure of attitude and angular rate. The fact that the gyros can be loosely captured thereby, permitting a controlled off null position, is an important feature of the mechanization. Moreover, this mechanization permits the mathematical development. The spin axis of the gyro is allowed to deviate from a null position with respect to the gyro case until a predetermined point is reached, at which time a constant torquing pulse is applied. This bang-band technique is shown in FIG. 3. Thus, the spin vector of the gyro has its motion controlled. The gyro pickoffs output the angular attitude between the case and spin vector (defining the gyro coordinate frame). The gyro torquers supply a measure of the angular rate of this gyro coordinate frame.

Figure 4:
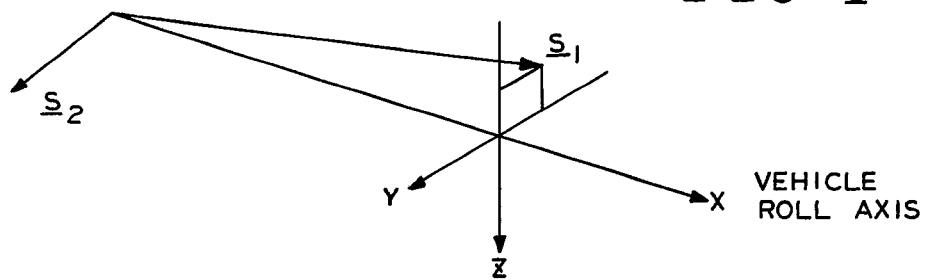
FIG. 4 is a graphical representation of the gyro pickoff geometry of the invention.

FIG. 4 shows the gyro pickoff geometry in terms of the spin vectors ($S_1$, $S_2$) of the two axis gyros. The vectors $S_1$ and $S_2$ represent the pitch and roll gyros respectively. Gyro outputs are a function of vector components as shown on the diagram for ($S_1$). A transformation can now be written between body coordinates and a frame defined by the plane of the gyro spin vectors. This is important as the gyros are purposely not captured tightly to the body, to facilitate computation. This scheme is made possible only because of the wide angular freedom of this instrument. The gyros are thus torqued only at a constant rate in a bang-bang fashion (as shown in FIG. 3).

When the gyro motor is displaced an angle less than $\theta_T$, no torquing takes place. When this value is exceeded, a constant torque $K_\theta$ is applied. A transformation $T_{BG}$ matrix can now be written between the body and gyro coordinates frames as follows:

$$T_{BG} = \begin{bmatrix} S_{1X} S_{2X} S_{3X} \\ S_{1Y} S_{2Y} S_{3Y} \\ S_{1Z} S_{2Z} S_{3Z} \end{bmatrix}_{Gyro} \begin{bmatrix} S_{1X} S_{2X} S_{3X} \\ S_{1Y} S_{2Y} S_{3Y} \\ S_{1Z} S_{2Z} S_{3Z} \end{bmatrix}_{Body}^{-1}$$

where $S_1$ and $S_2$ are the respective spin vectors of the two gyros $$S_1 = (S_{1X} S_{1Y} S_{1Z})$$
$$S_2 = (S_{2X} S_{2Y} S_{2Z})$$

and $S_3$ is orthogonal to $S_1$ and $S_2$ and is defined as $$\underline{S}_3 = \frac{\underline{S}_1 \times \underline{S}_2}{|\underline{S}_1 \times \underline{S}_2|}$$

In gyro coordinates, the vectors $S_1$ and $S_2$ are defined by $(S_1)_{Gyro} = (S_{1X} S_{1Y} S_{1Z})_{gyro} = (1, 0, 0)$
$(S_2)_{Gyro} = (S_{2X} S_{2Y} S_{2Z})_{gyro} = (\sin \theta, \cos \theta, 0)$
$\theta = \sin^{-1}(S_1 \times S_2)$, the angle between $S_1$ and $S_2$ Their components in body coordinates are found by taking their dot products with the vehicle axis directions, $$\begin{bmatrix} S_{1X} \\ S_{1Y} \\ S_{1Z} \end{bmatrix}_{Body} = \begin{bmatrix} \underline{S}_1 \cdot \underline{X}_{Body} \\ \underline{S}_1 \cdot \underline{Y}_{Body} \\ \underline{S}_1 \cdot \underline{Z}_{Body} \end{bmatrix}$$

$$\begin{bmatrix} S_{2X} \\ S_{2Y} \\ S_{2Z} \end{bmatrix}_{Body} = \begin{bmatrix} \underline{S}_2 \cdot \underline{X}_{Body} \\ \underline{S}_2 \cdot \underline{Y}_{Body} \\ \underline{S}_2 \cdot \underline{Z}_{Body} \end{bmatrix}$$

With the above transformation ($T_{BG}$) measured accelerations can be transformed from body coordinates to gyro coordinates. In order to perform navigational computations, it is necessary to compute a transformation from gyro or gyro momentum vector referenced to coordinate frame to a navigational coordinate frame such as a locally vertical frame (i.e., the Z axis is always along the local vertical direction).

There are now three coordinate frames of interest: The gyro or spin vector frame described previously, the computed navigational frame, and an inertial or space fixed frame. One commonly used navigational frame is a Local Vertical oriented coordinate frame. This frame will be utilized for the remainder of the development of this invention but it is neither a required or essential part of it. These transformations will be indicated by the notation $T_{NM}$, where the first subscript N represents the present coordinate frame and the second subscript M represents the new or transformed coordinate frame. The transformation between the gyro frame to the local vertical frame can be found by integrating:

$$\dot{T}_{GL} = -\Omega_L T_{GL} + T_{GL} \Omega_G$$

Where $\Omega_G$ is the skew symmetric matrix which is isomorphic to the rotation vector rate of the gyro coordinate frame and $\Omega_L$ is the skew symmetric matrix which is isomorphic to the rotation vector rate of the locally level frame.

Figure 5:
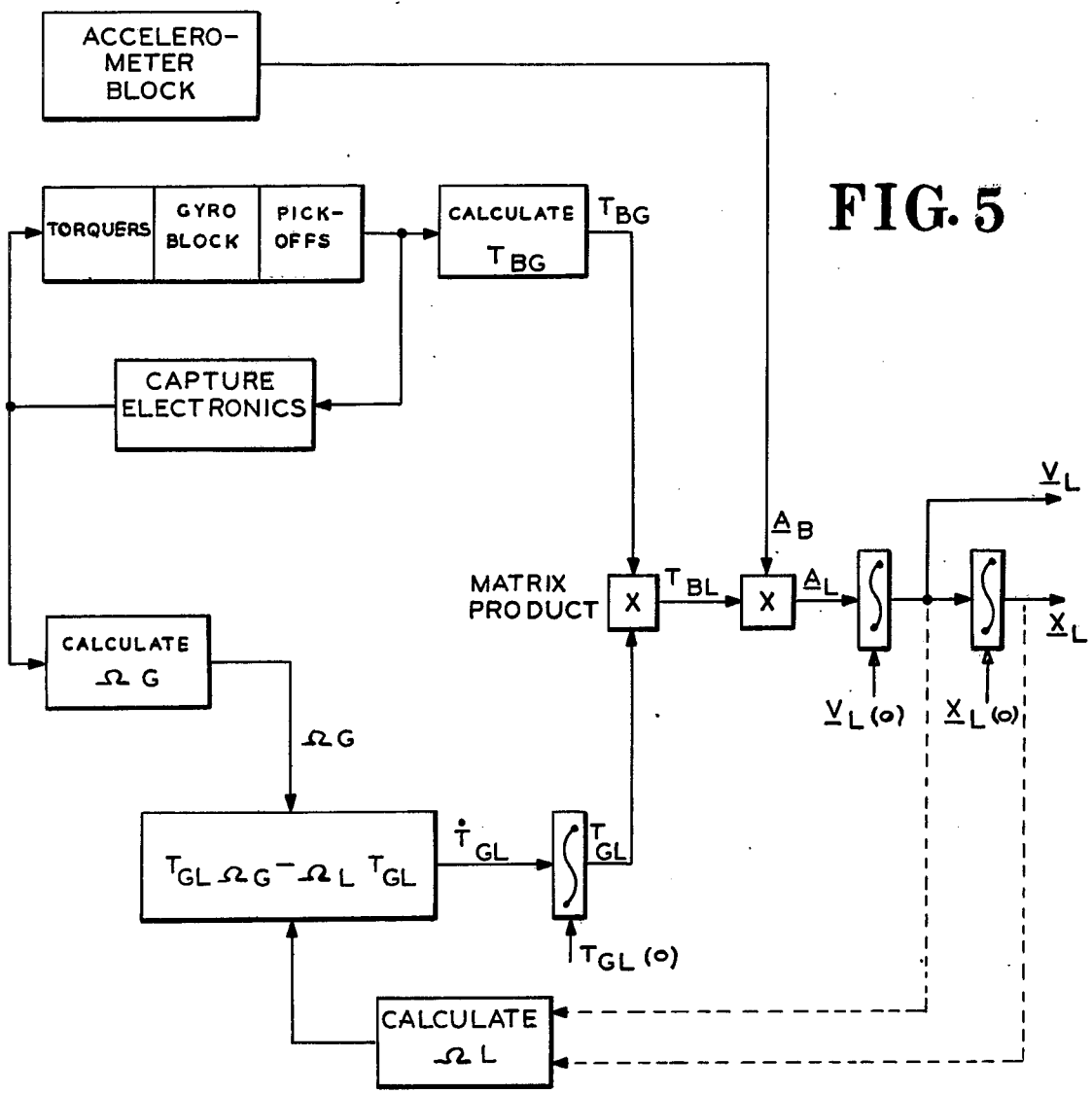
FIG. 5 is a block diagram of the mechanization of the locally level inertial navigation system of the invention.

FIG. 5 shows an overall mechanization of this computation.

The matrices $\Omega_L$ and $\Omega_G$ are of skew symmetric form and are dependent upon their respective angular frame rates as $$\Omega = \begin{bmatrix} 0 & -\omega_Z & \omega_Y \\ \omega_Z & 0 & -\omega_X \\ -\omega_Y & \omega_X & 0 \end{bmatrix}$$

where $\omega$ is a generalized frame rate vector.

The matrix $\Omega_G$ is a time varying matrix consisting of constant gyro torquing terms and zeros. At any time, these terms are either at their torquing values or are equal to 0. The matrix is shown below where $K_\theta$, $K_\psi$, $K_\phi$ are the constant torquing gains on the pitch, yaw and roll gyro axes respectively.

$$\Omega_G = \begin{bmatrix} 0 & -K_\psi & K_\theta \\ K_\psi & 0 & -K_\phi \\ -K_\theta & K_\phi & 0 \end{bmatrix}$$

The fact that this matrix consists of constant terms is what simplifies the analytical mechanization over conventional strapped down systems utilizing tightly captured gyros. The matrix $\Omega_L$ describes the angular frame rates of the locally level coordinate system and consists of terms which are functions of earth's rotation rate and vehicle motion.

From the foregoing, an inertial navigation system having wide angle gyroscopic freedom has been described. Due to the combined use of a wide angle gyroscope with constant level or bang-bang torquing, this invention supplies simplified computation over a conventional all attitude strapped down navigation system, as the gyroscopes are always torqued either at preselected constant rates or not at all. In this invention, the navigation system mechanization has been desensitized to higher frequency angular effects such as vehicle angular vibration. This is the case as the gyroscopes to not have tightly captured inertial elements which would necessarily follow all vehicle motions including vibrations. Vehicle motions are measured by the two transformation techniques as described in this invention.

While a particular embodiment of the invention has been shown and described, modifications may be made, and it is intended in the following claims to cover the embodiments which fall within the true spirit and scope of the invention.

What is claimed is:

1. A self contained strapped down inertial guidance system combining all axis, all attitude navigation comprising:
a vehicle in which said inertial system is mounted,
two wide angle, two-degree-of-freedom gyros having their cases rigidly mounted to said vehicle said gyros oriented so that their momentum vectors are non-parallel and having a predetermined span of angular freedom between said null and spin axes,
means for torquing said gyros at constant rates in a bang-bang torque fashion so that the long term torquing rates of said gyros equal the rotational rate of said vehicle whereby all vehicle restrictions are removed, and
means for computing corrections for said angular deviation between the null and spin axes by use of the electrical outputs of said gyro pickoffs.

2. The inertial guidance system of claim 1 comprising:
accelerometer means having three linearly independent axes for providing acceleration signals along said three axes to said computing means for transforming said gyro and acceleration signals into gyro coordinate signals.

3. The inertial guidance system of claim 2 comprising:
means in said computing means operative upon said gyro coordinate signals for generating navigation coordinate signals whereby the position and velocity of said vehicle is obtained.

4. The inertial guidance system of claim 3 comprising:
means for combining a source of gravitational acceleration signals with said navigation coordinate signals whereby the effect of the earth's gravitational attraction is computed during the flight of said vehicle.

5. The inertial guidance system of claim 4 comprising:
a first integration circuit in said computing means for computing the velocity of said vehicle, and
a second integration circuit in said computing means connected to the output of said first integrating circuit for computing the position of said vehicle.

6. The inertial navigation system of claim 5 comprising:
means for computing a transformation from gyro momentum vector referenced coordinate frame, to a navigational coordinate frame such as a locally vertical frame wherein the Z axis is always along the local vertical direction, and
means for computing necessary corrections for rotation rate of navigation frame with respect to inertial space.

7. A self-contained strapped down inertial navigation system for determining the attitude, position and velocity of a vehicle in which the navigation system is mounted comprising:
two wide angle, two-degree-of-freedom gyros having their cases rigidly mounted to said vehicle for providing attitude angles and angular rate signals along three orthogonally displaced axes,
accelerometer means for providing signals representative of the acceleration along said three linearly independent axes,
a first transformation matrix connected to the output of said gyros and accelerometers for transforming said gyro and accelerometer signals from body coordinates to gyro coordinates, and
a second transformation matrix connected to the output of said first matrix and said gyros for transforming said gyro coordinates into navigation coordinates.

8. The method of determining the attitude, position, and velocity of a vehicle in a self-contained strapped down inertial navigation system comprising:
torquing two wide angle, two degree of freedom gyros in such a manner so that only the long term torquing rates must equal those of said vehicle and so that all vehicle attitude restrictions are removed,
maintaining a predetermined span of angular freedom between the null axes and the spin axes of said gyros,
computing corrections for said angular deviation between said null axis and spin axis by use of the electrical output of the gyro pickoffs,
computing the overall angular relationship between the body fixed frame and navigation frame by combining the said connection for angular deviation between said null axis and spin axes with said angular relationship between the gyro coordinate frame and navigation frame,
measuring the vehicle acceleration by means of a linearly independent triad of accelerometers rigidly mounted to said vehicle,
computing vehicle acceleration in navigation coordinates by transforming said vehicle acceleration into navigation coordinates by means of the matrix comprised of said vehicle attitude and augmenting it with local gravitational acceleration, and
computing position and velocity by doubly integrating said acceleration in navigation coordinates subject to necessary coordination for rotation of the navigation frame.

* * * * *